United States Patent Office
3,546,179
Patented Dec. 8, 1970

3,546,179
PROCESS FOR THE CATALYTIC POLYCONDENSATION OF BIS-HYDROXYALKYL ESTERS OF DICARBOXYLIC ACIDS
Walter Koller, Frankfurt am Main, Germany, assignor to Farbwerke Hoechst Aktiengesellschaft vormals Meister Lucius & Bruning, Frankfurt am Main, Germany, a corporation of Germany
No Drawing. Filed Apr. 10, 1968, Ser. No. 720,366
Claims priority, application Germany, Apr. 19, 1967, F 52,183
Int. Cl. C08g 17/015
U.S. Cl. 260—75
12 Claims

ABSTRACT OF THE DISCLOSURE

A process is provided for preparing polyesters and co-polyesters by polycondensation of bis-hydroxyalkyl esters of dicarboxylic acids in the presence of compounds containing silicon and phosphorus as catalysts. The polymers so obtained can be used for making fibers and films.

---

The present invention relates to a process for the manufacture of fiber- and film-forming polyesters.

It has already been proposed to make linear fiber- and film-forming polyesters or copolyesters, which are wholly or partially built up from aromatic dicarboxylic acids and diols, by an ester-interchange between low alkyl esters of corresponding dicarboxylic acids and diols and polycondensation of the resulting "precondensate" by heating in vacuo. Both reaction stages, the ester-interchange as well as the polycondensation, are strongly accelerated by the addition of a catalyst. Advantageously, short reaction times are used in order to prevent chain-termination and cleavage reactions which are mainly caused by the high polycondensation temperatures and would in turn lead to polyesters of only a low degree of polycondensation and of unsatisfactory colour.

A great number of catalysts have been proposed for the manufacture of linear fiber- and film-forming polyesters, which catalyze either the ester-interchange or the polycondensation or both.

However, these catalysts do not, generally, meet all requirements. A catalyst for the manufacture of linear fiber- and film-forming polyesters should be active without catalyzing any side reactions, for example, dehydration reactions, thermal degradation, or degradation of the polyesters under the action of light. The polyesters should, moreover, have as high a degree of whiteness as possible.

Now I have found that linear, fiber- and film-forming polyesters and/or copolyesters can be obtained in an advantageous manner by polycondensation of bis-hydroxyalkyl-dicarboxylic acid esters in the presence of catalysts by using as the catalyst an ester and/or a salt of a compound of the following formula

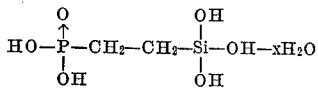

in which $x$ is 1.5 or a number below 1.5.

As bis-hydroxyalkyl-dicarboxylic acid esters there may be used those which can be polycondensed to yield fiber- and film-forming polyesters. As acid components of these bis-hydroxyalkyl-dicarboxylic acid esters it is advantageous to use, for example, terephthalic acid, isophthalic acid, 4,4'-diphenyl-dicarboxylic acid, 2,5-dimethyl-terephthalic acid, 5-sulfo-isophthalic acid, bis-p-carboxyphenoxyethane, naphthalene dicarboxylic acids (-1,3; -1,4; -1,5; -2,6), hexahydroterephthalic acid and sebacic acid; as alcohol components there are used diols with advantageously 2 to 10 carbon atoms, for example, aliphatic diols, e.g., ethylene glycol, propanediol-1,2, propanediol-1,3, butanediol-1,4, 2,2-dimethylpropanediol; cycloaliphatic diols, e.g., cyclobutanediol-1,2 and -1,3 and 1,4-dimethylolcyclohexane; and aromatic-aliphatic diols, e.g., 1,3- and 1,4-xylylene-glycol. As modification components there may be added to the polycondensation batch compounds carrying a hydroxyl group as well as a carboxyl group which may be free or esterified with a low alcohol, for example, p—HO—C₆H₄—COOH,

p—HOCH₂—CH₂—O—C₆H₄—COOH, or aromatic diols, for example hydroquinone. The polycondensation of the bis-hydroxyalkyl-dicarboxylic acid esters is carried out in known manner at elevated temperatures under reduced pressure. It is also possible to add, for example, pigments, delusterants or optical brighteners in usual manner.

The linear, fiber- and film-forming polyesters may be built up from identical or different dicarboxylic acid components and diol components. Preferably, polyesters are made in which the dicarboxylic acid units consist of more than 75% of terephthalic acid units.

As catalysts for the polycondensation of bis-hydroxyalkyl-dicarboxylic acid esters there are used, in accordance with the invention, esters and/or salts of compounds of the following formula

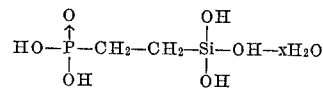

in which $x$ is 1.5 or a number below 1.5.

The esters and/or salts of silanetriol-ethane-phosphonic acid and the condensation products thereof are made by known methods. The penta-alkyl esters may be obtained, for example, according to U.S. Pat. 3,122,581, from a dialkyl phosphite and a vinyl trialkoxysilane. When it is attempted to make esters and salts of silanetriol-ethane-phosphonic acid that carry free hydroxyl groups at the silicon atom, condensation of two or more molecules to products of high molecular weight takes places with the separation of water and formation of

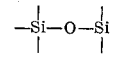

bonds since, as is known, free silanols are hardly stable.

It is also possible that one and the same molecule may contain different ester or salt groups, both ester and salt groups, and even ester groups, salt groups and one or two free OH groups linked to the phosphorus atom, for example,

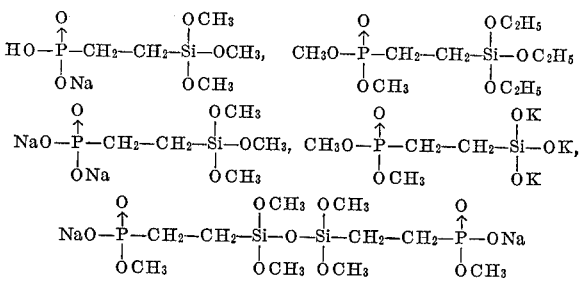

Particularly suitable polycondensation catalysts in accordance with the invention are those esters and/or salts of silanetriol-ethane-phosphonic acid and the condensation products thereof, in which the ester groups contain radicals of low aliphatic alcohols with advantageously 1 to 4 carbon atoms and of which the salt groups contain alkali metal ions (Li, Na, K, Rb, Cs; advantageously Na, K). Examples of such substances are trimethoxy-silane-ethane-phosphonic acid-diethyl ester, triethoxysilane-ethane-phosphonic acid-diethyl ester, trimethoxysilane-ethane-phosphonic acid-dimethyl ester, and tri-n-butoxysilane-ethane-phosphonic acid-di-n-butyl ester, the condensation products of silanetriol-ethane-monosodium phosphonate and of silanetriol-ethane-disodium phosphonate.

Mixtures of the above compounds may also be used.

The derivatives of silanetriol-ethane-phosphonic acid serving as catalysts for the polycondensation of bis-hydroxy-alkyl-dicarboxylic acid esters should be present in the polycondensation batch in such an amount that 0.01 to 0.1% by weight, calculated on bis-hydroxyalkyl-dicarboxylic acid ester, of silicon is present. These limits are not rigid, however, and amounts somewhat outside this range may also be used without the good catalytic action being affected. The liquid or pulverized solid catalysts may be added to the polycondensation batch either as such or in the form of a solution or dispersion, advantageously in the diol forming the alcohol component of the bis-hydroxyalkyl-dicarboxylic acid ester to be condensed.

By using the new catalysts in accordance with the invention, polyesters of high degrees of polycondensation which are distinguished by a high melting point, a high degree of whiteness and a good stability to heat and light are obtained in a short time. Moreover, the melt viscosity of the polycondensates is considerably increased and the stiffness in flexure of the filaments made from the polycondensates is strongly reduced. These two effects taken together enable the obtainment of fibers which yield non-pilling textiles, i.e., textiles which, in use, do not tend to form small knots at the surface.

As compared with the compounds proposed in South African Pat. No. 65/3793 and its counterpart U.S. Pat. No. 3,406,152 as polycondensation catalysts namely, alkaline or alkaline earth metal salts of benzylsilanetriol-p-sulfonic acid or condensation products thereof, the catalysts in accordance with the invention have a still improved effect as regards the increased melt viscosity, the reduced pilling tendency of the fibers and especially the improved dyeing affinity of the fibers and filaments. Another advantage of the polycondensation catalysts of the invention is that they enable polyesters of a high degree of whiteness and good heat stability to be obtained without the usual additions of compounds of trivalent phosphorus. The catalysts of the invention can furthermore be obtained in a simple and technically advantageous manner.

The following examples serve to llustrate the invention, but are not intended to limit it.

EXAMPLE 1

In a stainless steel apparatus 12 kilograms terephthalic acid dimethyl ester, 9 kilograms ethylene glycol and 2.4 grams zinc acetate were heated under nitrogen for 2½ hours, while stirring, the temperature being increased from an initial 160° C. to 215° C. An ester-interchange product consisting mainly of bis-β-hydroxyethyl terephthalate was formed with splitting off of methanol. This precondensate was polycondensed after the addition of 48 grams trimethoxysilane-ethane-phosphonic acid-diethyl ester and 288 grams of a 17% by weight suspension of titanium dioxide in ethylene glycol. For carrying out the polycondensation, the temperature was increased within 2 hours, while stirring, from an initial 245° C. to 275° C. while the pressure was simultaneously reduced to 1 millimeter of mercury. After further heating for 15 minutes at 275° C. under 0.6 millimeter of mercury, the viscous polycondensate was spun from a 1-hole nozzle, the resulting filament was chilled with water and cut into chips about 5 millimeters long. The latter had a softening point of 260.2° C. and a relative viscosity of 1.695, determined at 25° C. on a 1% by weight solution in phenol-tetrachlorethane (ratio by volume 3:2). After having been dried under 40 millimeters of mercury for 4 hours at 80° C. and 2½ hours at 160° C., the polycondensate had a melt viscosity of 1,405 poises at 285° C. with a relative viscosity of the melt cake of 1.660. Contrary thereto, a polyethylene terephthalate of the same relative viscosity which had been prepared with the use of antimony trioxide as the polycondensation catalyst had a melt viscosity of only 1,045 poises.

The dried polyethylene terephthalate chips which had been made with the help of trimethoxysilane-ethane-phosphonic acid-diethyl ester as the catalyst were again melted and spun at 280° C. on an extruder from a 24-hole nozzle of a hole diameter of 0.25 millimeter at a rate of 19.2 grams/minute and a draw-off rate of 500 meters/minute.

The filaments of 100 spinning bobbins were combined into a tow of a titer of about 2,000. The tow was drawn at a ratio of 1:4, passing at a feed rate of 13.5 meters through a steam zone 2 meters long. The tow was then conducted over two flat irons each 2.40 meters long, at temperatures of 100 and 118° C., respectively, then over a preparation roller and finally, for drying, over a flat iron 2.40 meters long of a temperature of 140° C. The sliver was then crimped in a stuffing chamber and cut to lengths of 65, 80 and 140 millimeters. The fiber so obtained had a tensile strength of 3.2 grams/denier and an elongation at break of 60.7%. The reflectance values of the fiber determined according to the standard valent system DIN 5033 with a Zeiss-Elrefo-apparatus and colour measuring filters FMX–C, FMY–C and FMZ–C were as follows:

$Rx$ 76.8, $Ry$ 75.6, $Rz$ 72.6

Jersey made of this fiber (0.4 denier/75 M,N$m$ 40/1, 505 Z, weave Wevenit, Morat division 16) did not pill after 1½ hours in a Random-Tumble-Pilling-Tester of Messrs. Atlas Electric Devices Co. (cf. ASTM Standard on Textile Materials 1961, page 552, and Bulletin X 96 of Messrs. Du Pont Co., Wilmington, Del.), whereas a comparison fabric of normal polyethylene terephthalate pilled strongly.

EXAMPLE 2

After the addition of 0.69 gram zinc acetate and 2.14 grams manganese(II) acetate, 12 kilograms terephthalic acid dimethyl ester were subjected to an ester-interchange with 9 kilograms ethylene glycol as described in Example 1. 24 grams trimethoxysilane-ethane-phosphonic acid diethyl ester and 288 grams of a 17% by weight suspension of titanium dioxide in ethylene glycol were added and the ester-interchange product was polycondensed. For this purpose, the temperature was increased within 2 hours from an initial 245° C. to 275° C. while the pressure was simultaneously reduced to 1 millimeter of mercury. After further heating for 1¾ hours at 278° C. under 0.3 millimeter of mercury, the polycondensate was made into chips as described in Example 1. The chips had a softening point of 261.5° C. and a relative viscosity of 1.718, determined as in Example 1. The polycondensate was dried, spun and cut into fibers as described in Example 1. The fibers had a tensile strength of 3.1 grams/denier and an elongation at break of 31.8%.

The reflectance values of the fiber, determined according to the standard valent system DIN 5033 were as follows:

$Rx$ 77.8, $Ry$ 67.4, $Rz$ 73.8

EXAMPLE 3

To an ester-interchange product of 12 kilograms terephthalic acid dimethyl ester, 9 kilograms ethylene glycol and 2.4 grams zinc acetate, obtained as described in Example 1, there were added 288 grams of a 17% by weight suspension of titanium dioxide in ethylene glycol and a solution containing in 1 liter ethylene glycol 48 grams of a condensate of β-silanetriol-ethane-disodium phosphonate obtained by intermolecular splitting off of 1½ molecules water. To prepare this solution, 48 grams of the condensate of β-silanetriol-ethane-disodium phosphonate were dissolved in 500 milliliters of hot water, the solution was introduced into 1½ liters ethylene glycol and concentrated to 1 liter under reduced pressure. It was necessary to proceed according to this method of dissolution because the condensate of β-silanetriol-ethane-disodium phosphonate did not enter into solution in the ethylene glycol direct.

For carrying out the polycondensation, the temperature was raised within 2 hours, while stirring, from an initial 245° C. to 275° C. while the pressure was simultaneously reduced to 1 millimeter of mercury. Heating was continued for 3¼ hours at 275° C. under 0.3 millimeter of mercury. The polycondensate was then made into chips as described in Example 1. The chips had a softening point of 260.7° C., a relative viscosity of 1.482, determined as described in Example 1, and a melt viscosity of 810 poises. Contrary thereto, a normal polyethylene terephthalate of the same relative viscosity had a melt viscosity of 305 poises.

By drying and spinning as described in Example 1 at a spinning temperature of 285° C. and drawing on a Zinser drawing machine at a ratio of 1:4, filaments of a tensile strength of 2.5 grams/denier and an elongation at break of 27.1% were obtained. The mean flex life was 415 cycles, as determined according to the known method of K. H. Grünewald, while that of a normal polyethylene terephthalate fiber of a viscosity of 1.780 to 1.840 was within the range of from 3,000 to 3,500 cycles.

The reflectance values of the fiber, determined according to the standard valent system DIN 5033 were as follows:

$Rx$ 90.8, $Ry$ 90.7, $Rz$ 85.9

EXAMPLE 4

An ester-interchange product of 12 kilograms terephthalic acid dimethyl ester, 9 kilograms ethylene glycol and 2.4 grams zinc acetate, obtained as described in Example 1, was polycondensed after the addition of 288 grams of a 17% by weight suspension of titanium dioxide in ethylene glycol and of a solution containing in 1 liter ethylene glycol 48 grams of a condensate of β-silanetriol-ethane-disodium phosphonate obtained by intermolecular splitting-off of 1½ molecules water. For the polycondensation, the temperature was increased within 2 hours, while stirring, from an initial 245° C. to 275° C. and the pressure was simultaneously reduced to 1 millimeter of mercury. After heating for a further 45 minutes under 0.3 millimeter of mercury, the polycondensate was made into chips as described in Example 1. The chips had a softening point of 260.3° C. and a relative viscosity of 1.472, determined as described in Example 1. The melt viscosity was 845 poises. Contrary thereto, a comparison product of the same solution viscosity had a melt viscosity of 301 poises.

By drying and spinning as described in Example 1 at a spinning temperature of 285° C. and drawing on a Zinser drawing machine at a ratio of 1:4, filaments of a tensile strength of 2.4 grams/denier and an elongation at break of 27.1% were obtained. The mean flex life (see Example 3) was 245 cycles.

The fiber had the following reflectance values as determined according to the standard valent system DIN 5033:

$Rx$ 90.3, $Ry$ 90.2, $Rz$ 86.7

EXAMPLE 5

To a melt, having a temperature of 160° C., of 200 grams pure dry terephthalic acid-bis-β-hydroxyl ester there was added, while stirring, a solution containing in 25 milliliters ethylene glycol 0.544 gram of a condensate of β-silanetriol-ethane-disodium phosphonate obtained by intermolecular splitting-off of 1½ molecules water. To prepare this solution, the salt was first dissolved in 50 milliliters of hot water, 75 milliliters ethylene glycol were added and the solution was concentrated to 25 milliliters under reduced pressure.

After the addition of this solution, the whole was heated under nitrogen to 250° C., the pressure being gradually reduced within 2¾ hours to less than 1 millimeter of mercury. The temperature was then raised within 15 minutes to 278° C. and the whole was heated for a further 4 hours under 0.3 millimeter of mercury. The polyester, so obtained had a softening point of 275° C. and a relative viscosity of 1.593, determined as described in Example 1.

EXAMPLE 6

122.4 grams terephthalic acid dimethyl ester, 13.6 grams isophthalic acid dimethyl ester, 108.9 grams ethylene glycol and 0.0272 gram zinc acetate were heated within 3¾ hours, while stirring, from an initial 160° C. to 210° C. until termination of the splitting-off of methanol. The ester-interchange product so obtained was polycondensed after the addition of 0.5440 gram triethoxysilane-ethane-phosphonic acid diethyl ester and 3.2 grams of a 17% by weight suspension of titanium dioxide in ethylene glycol. To carry out the polycondensation, the mixture was first heated under nitrogen to 250° C., the pressure being gradually reduced within 2¾ hours to less than 1 millimeter of mercury. The temperature was then raised within a short time to 278° C. and heating was continued for a further 1 hour and 10 minutes under 0.5 millimeter of mercury. A colourless polycondensate of a softening point of 249° C. and a relative viscosity of 1.716, determined as described in Example 1, was obtained.

EXAMPLE 7

136.0 grams terephthalic acid dimethyl ester, 4.4 grams sodium isophthalic acid-dimethyl ester-5-sulfonate, 108.9 grams ethylene glycol and 0.0272 gram zinc acetate were heated within 5¼ hours, while stirring, from an initial 160° C. to 210° C. until termination of the splitting-off of methanol. The ester-interchange product so obtained was polycondensed as described in Example 6, after the addition of 0.5440 gram triethoxysilane-ethane-phosphonic acid-diethyl ester and 3.2 grams of a 17% by weight suspension of titanium dioxide in ethylene glycol. After a temperature of 278° C. had been reached, heating was continued for a further 1¼ hours under 0.8 millimeter of mercury. The colourless polycondensate so obtained had a softening point of 225° C. and a relative viscosity of 1.915, determined as described in Example 1.

EXAMPLE 8

An ester-interchange product of 12 kilograms terephthalic acid dimethyl ester, 9 kilograms ethylene glycol and 2.4 grams zinc acetate as described in Example 1, was dissolved in 1 liter ethylene glycol and polycondensed, after the addition of 48 grams of a condensate of β-silanetriol-ethane-monosodium phosphonate obtained by intermolecular splitting-off of 1½ molecules water. To carry out the polycondensation, the temperautre was raised within 2 hours from an initial 245° C. to 275° C. and the pressure was simultaneously reduced to 1 millimeter of mercury. Heating was continued for a further 45 minutes at 275° C. under 0.5 millimeter of mercury. The polycondensate was made into chips as described in Example 1. The chips had a softening point of 260.7° C. and a relative viscosity of 1.559, determined as described in Example 1.

EXAMPLE 9

593 grams terephthalic acid dimethyl ester, 475 grams ethylene glycol and 0.1168 gram zinc acetate were heated within 5¼ hours, while stirring, from an initial 160° C. to 210° C. until termination of the splitting-off of methanol. After the addition of 4.744 grams of a mixture of about equal parts by weight of the mono- and disodium salts of a condensate of silanetriol-ethane-phosphonic acid obtained by intermolecular splitting-off of 1½ molecules water in the form of a 1.5% solution in ethylene glycol and 13.95 grams of a 17% by weight suspension of titanium dioxide in ethylene glycol, the ester-interchange product was polycondensed as described in Example 6. After a temperature of 278° C. had been reached, heating was continued for a further 1 hour and 50 minutes under 0.5 millimeter of mercury. A colourless polycondensate of a softening point of 258° C. and a relative viscosity of 1.509, determined as described in Example 1, was obtained.

After comminuting the polycondensate in a cross beater mill and drying for 5 hours at 150° C. under 1 millimeter of mercury, the granular product which had a grain size of about 2 millimeters was spun at 290° C. on an extruder from a 24-hole nozzle of a hole diameter of 0.25 millimeter, at a rate of 18.3 grams and a draw-off rate of 1000 meters/minute. After drawing on a Zinser drawing machine at a ratio of 1:3.65, the filaments had a tensile strength of 2.4 grams/denier and an elongation at break of 30.8%. The mean flex life was 148 cycles as determined according to the known method of K. H. Grünewald.

EXAMPLE 10

In a stainless steel vessel, 800 kilograms terephthalic acid dimethyl ester, 0.4 kilogram trimellitic acid trimethyl ester, 660 kilograms ethylene glycol and 184 grams zinc acetate were heated within 4½ hours, while stirring, from an initial 160° C. to 235° C. until termination of the splitting-off of methanol. 6.4 kilograms triethoxysilane-ethane-phosphonic acid-diethyl ester dissolved in 10 kilograms ethylene glycol were added while stirring and the ester-interchange mixture was transferred under pressure into an autoclave. After the addition of 3.2 kilograms titanium dioxide suspended in 19 kilograms ethylene glycol, the excess amount of ethylene glycol was distilled off and the product was polycondensed. For this purpose, the pressure was reduced within 45 minutes, while stirring, to less than 1 millimeter of mercury and the temperature was gradually increased to 227° C. After heating for a further 3½ hours, a colourless polycondensate of a softening point of 260.4° C., a melt viscosity of 1985 poises and a relative viscosity of 1.560, determined as described in Example 1, was obtained.

A fiber obtained in a manner analogous to Example 1, but which had been set with steam had a tensile strength of 2.6 grams/denier, an elongation at break of 33.0%, a crimp retentivity of 50.0% and a relative viscosity of 1.418.

A standard jersey made of this fiber (see Example 1) showed an optimum pilling behavior (RPG 0) in the pilling test (see Example 1).

When this jersey was set for 30 seconds at 185° C. and dyed with Samaron Red BL in the presence of a carrier (90 minutes, 98° C., 3 grams/liter Remol P), the relative colouring strength was about twice that obtained with a comparison jersey of normal polyethylene terephthalate: 78% as compared with 35% (normal non-set jersey of polyethylene terephthalate=100%).

What is claimed is:

1. In a process for the manufacture of fiber- and film-forming polyesters or copolyesters by polycondensation of bis-hydroxyalkyl dicarboxylic acid esters in the presence of catalysts the improvement which comprises using as a polycondensation catalyst a lower aliphatic ester of a compound of the following formula

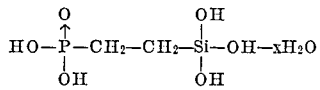

in which $x$ is 1.5 or a number below 1.5.

2. In a process for the manufacture of fiber- and film-forming polyesters or copolyesters by polycondensation of bis-hydroxyalkyl dicarboxylic acid esters in the presence of catalysts the improvement which comprises using as polycondensation catalysts esters and salts of a compound of the following formula

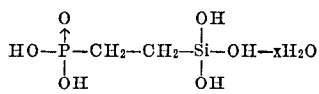

in which $x$ is 1.5 or a number below 1.5, the ester groups are esters of lower aliphatic alcohols with 1 to 4 carbon atoms and the salt groups are salts of alkali metals.

3. In a process for the manufacture of fiber- and film-forming polyesters or copolyesters by polycondensation of bis-hydroxyalkyl dicarboxylic acid esters in the presence of catalysts the improvement which comprises using as a polycondensation catalyst an ester of a compound of the following formula

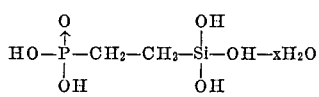

in which $x$ is 1.5 or a number below 1.5, and the ester groups are esters of lower aliphatic alcohols with 1 to 4 carbon atoms.

4. In a process for the manufacture of fiber- and film-forming polyesters or copolyesters by polycondensation of bis-hydroxyalkyl dicarboxylic acid esters in the presence of catalysts the improvement which comprises using as a polycondensation catalyst an alkali metal salt of a compound of the following formula

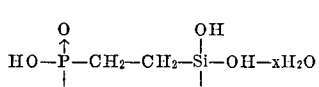

in which $x$ is 1.5 or a number below 1.5.

5. A process according to claim 1 wherein the catalyst is used in an amount to provide 0.01 to 0.1% by weight of silicon, based on the weight of bis-hydroxyalkyl-dicarboxylic acid ester.

6. A process according to claim 2 wherein the catalyst is used in an amount to provide 0.01 to 0.1% by weight of silicon, based on the weight of bis-hydroxyalkyl-dicarboxylic acid ester.

7. A process according to claim 4 wherein the catalyst is used in an amount to provide 0.01 to 0.1% by weight of silicon, based on the weight of bis-hydroxyalkyl-dicarboxylic acid ester.

8. A process according to claim 2 wherein the catalyst is trimethoxysilane-ethane-phosphonic acid-diethyl ester.

9. A process according to claim 2 wherein the catalyst is a condensate of beta-silanetriol-ethane-disodium phosphonate.

10. A process according to claim 2 wherein the catalyst is triethoxysilane-ethane-phosphonic acid diethyl ester.

11. A process according to claim 2 wherein the catalyst is a condensate of beta-silanetriol-ethane-monosodium phosphonate.

12. A process according to claim 2 wherein the catalyst is a mixture of the mono- and disodium salts of a condensate of silanetriol-ethane-phosphonic acid.

References Cited

UNITED STATES PATENTS 3,406,152 10/1968 Koller _____ 260—75
3,406,153 10/1968 Eaton et al. _____ 260—75

WILLIAM H. SHORT, Primary Examiner

L. P. QUAST, Assistant Examiner

U.S. Cl. X.R.

260—47, 448.8, 932; 264—176